United States Patent
Nahrwold et al.

(10) Patent No.: US 11,440,417 B2
(45) Date of Patent: Sep. 13, 2022

(54) SYSTEM AND METHOD FOR ADJUSTING VEHICLE PERFORMANCE

(71) Applicant: Dana Automotive Systems Group, LLC, Maumee, OH (US)

(72) Inventors: Thomas L. Nahrwold, Maumee, OH (US); Amar Nivarthi, Maumee, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 281 days.

(21) Appl. No.: 16/794,783

(22) Filed: Feb. 19, 2020

(65) Prior Publication Data
US 2021/0252983 A1 Aug. 19, 2021

(51) Int. Cl.
*B60L 15/20* (2006.01)
*B60L 7/10* (2006.01)
*B60L 58/12* (2019.01)

(52) U.S. Cl.
CPC .......... *B60L 15/20* (2013.01); *B60L 7/10* (2013.01); *B60L 58/12* (2019.02); *B60L 2240/423* (2013.01); *B60L 2240/622* (2013.01); *B60L 2240/642* (2013.01); *B60L 2240/66* (2013.01)

(58) Field of Classification Search
CPC ............ B60L 15/20; B60L 2240/423; B60L 2240/622; B60L 2240/642; B60L 2240/66; B60L 2240/463; B60L 2240/667; B60L 2250/26; B60L 2250/28
See application file for complete search history.

(56) References Cited

U.S. PATENT DOCUMENTS

| 2019/0071087 A1* | 3/2019 | Virgen | B60W 40/04 |
| 2020/0070679 A1* | 3/2020 | Wang | B60L 58/12 |
| 2020/0398844 A1* | 12/2020 | Ruybal | B60W 10/119 |
| 2021/0245727 A1* | 8/2021 | Zhao | F02D 41/10 |

FOREIGN PATENT DOCUMENTS

| CN | 103225557 A * | 7/2013 | ............. B60K 26/04 |
| DE | 102013201010 A1 * | 8/2013 | .......... F02D 13/0203 |
| DE | 102014009856 A1 * | 1/2016 | ........ B60W 50/0098 |
| FR | 2999511 A1 * | 6/2014 | ............ B60W 50/10 |
| GB | 2454338 A * | 5/2009 | ............ F02D 11/105 |
| JP | 4092886 B2 * | 5/2008 | |

OTHER PUBLICATIONS

Engerman, E., "Electric Drive Axle System With a Self-Indexing Clutch and Method for Operation of Said Clutch," U.S. Appl. No. 16/794,703, filed Feb. 19, 2020, 51 pages.
Nahrwold, T., "Dig Mode System and Method for Vehicle," U.S. Appl. No. 16/794,618, filed Feb. 19, 2020, 36 pages.
(Continued)

*Primary Examiner* — Michael J Zanelli
(74) *Attorney, Agent, or Firm* — McCoy Russell LLP

(57) ABSTRACT

Methods and systems for operating axles of a vehicle are provided. In one example, relationships between accelerator pedal position and driver demand torque may be adjusted as a function of a vehicle's geographical location. Further, a relationship between brake pedal position and requested braking amount may be adjusted as a function of a vehicle's geographical location.

19 Claims, 6 Drawing Sheets

(56) References Cited

OTHER PUBLICATIONS

Engerman, E. et al., "Electric Axle System With Removable Planetary Gear Assembly," U.S. Appl. No. 16/794,643, filed Feb. 19, 2020, 50 pages.
Nahrwold, T., "Sand Mode System and Method for a Vehicle," U.S. Appl. No. 16/794,647, filed Feb. 19, 2020, 33 pages.
Engerman, E., "Electric Drive Axle Gear Train and Method for Manufacturing Said Gear Train," U.S. Appl. No. 16/794,654, filed Feb. 19, 2020, 48 pages.
Wesolowski, S. et al., "System and Method for Characterizing a Clutch," U.S. Appl. No. 16/794,675, filed Feb. 19, 2020, 43 pages.
Engerman, E., "Electric Drive Axle System With Multi-Speed Gear Train," U.S. Appl. No. 16/794,632, filed Feb. 19, 2020, 37 pages.
Engerman, E., "Vehicle System With Multiple Electric Drive Axles," U.S. Appl. No. 16/795,263, filed Feb. 19, 2020, 43 pages.
Engerman, E., "Electric Drive Axle With Lubrication System," U.S. Appl. No. 16/795,280, filed Feb. 19, 2020, 47 pages.

\* cited by examiner

SYSTEM AND METHOD FOR ADJUSTING VEHICLE PERFORMANCE

FIELD

The present disclosure relates to adjusting driveline performance according to a geographical position of a wheeled vehicle. The system and method may be particularly useful for off-road vehicles.

BACKGROUND AND SUMMARY

Some vehicles may have range limit constraints due to the amount of energy that the vehicles may store on-board. Further, refilling stations for some types of energy may be less plentiful than refilling stations for other types of vehicles. For example, a driving range of an electric vehicle before the electric vehicle needs recharging may be 500 kilometers or less while a driving range for a petrol fueled vehicle may be 750 kilometers. Nevertheless, it may be desirable to conserve energy for both types of vehicles to save money and to reduce emissions. However, some drivers of vehicles have tendencies that make conserving energy more difficult. For example, some drivers may apply an accelerator pedal in a way that causes the vehicle to accelerate at a higher rate, only to have the driver apply the vehicle brakes to slow the vehicle a short time later. Consequently, the rapid vehicle starts and stops may lead to increased energy consumption.

The inventors herein have recognized the above-mentioned issues and have developed a method for operating a vehicle powertrain, comprising: adjusting a relationship between an accelerator pedal position and a powertrain torque request in response to a geographical position of a vehicle.

By adjusting a relationship between an accelerator pedal position and a powertrain torque request in response to a geographical position of a vehicle, it may be possible to provide the technical result of improving vehicle fuel conservation. For example, a rate of requested wheel torque as a function of accelerator pedal position may be reduced while a vehicle is traveling in heavy traffic. This action may cause a driver to accelerate the vehicle at a lower rate so that less energy may be used to accelerate the vehicle. However, if the same vehicle is driven on a high-way with little traffic, the requested wheel torque as a function of accelerator pedal position may be increased for lower accelerator pedal deflections so that the vehicle provides a feel of higher performance. In addition, the accelerator pedal position to driver demand torque relationship may be adjusted for weather conditions and based on prior travel history to limit wheel slip, thereby improving vehicle energy conservation. In a similar way, a relationship between a position of a brake pedal and a requested braking power may be adjusted as a function of a vehicle's geographical location and weather conditions to reduce the possibility of wheel lock and improve regeneration by the vehicle.

The present description may provide several advantages. In particular, the approach may improve vehicle energy conservation. In addition, the approach may reduce wheel slip and wheel locking to improve vehicle drivability. Further, the approach may be suitable for electric vehicles, hybrid vehicles, and vehicles that are propelled via hydrocarbon fuels.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
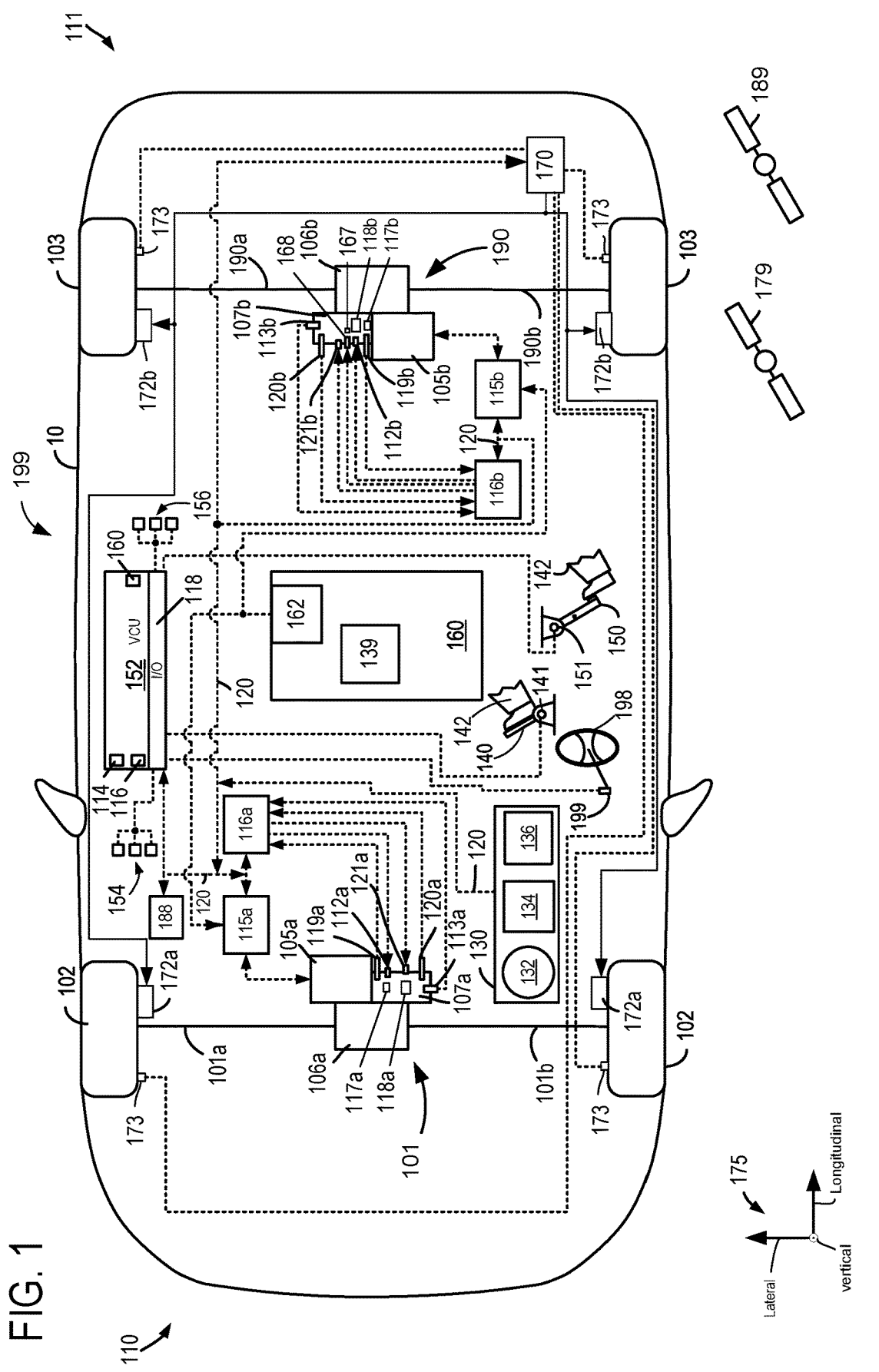
FIG. 1 is a schematic diagram of a first vehicle powertrain.
Figure 2:
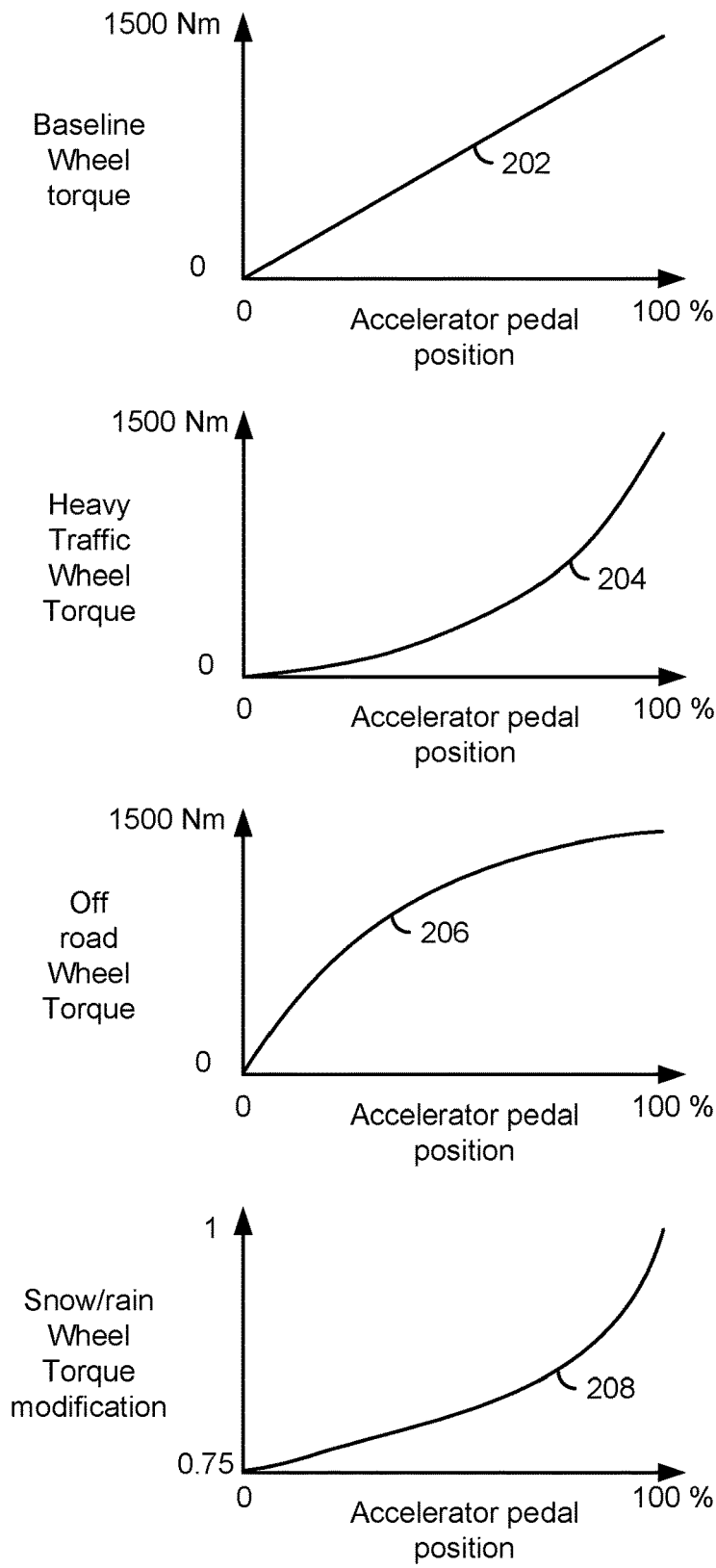
FIGS. 2-4 show graphical representations of relationships between actuator positions and vehicle control parameters.
Figure 3:
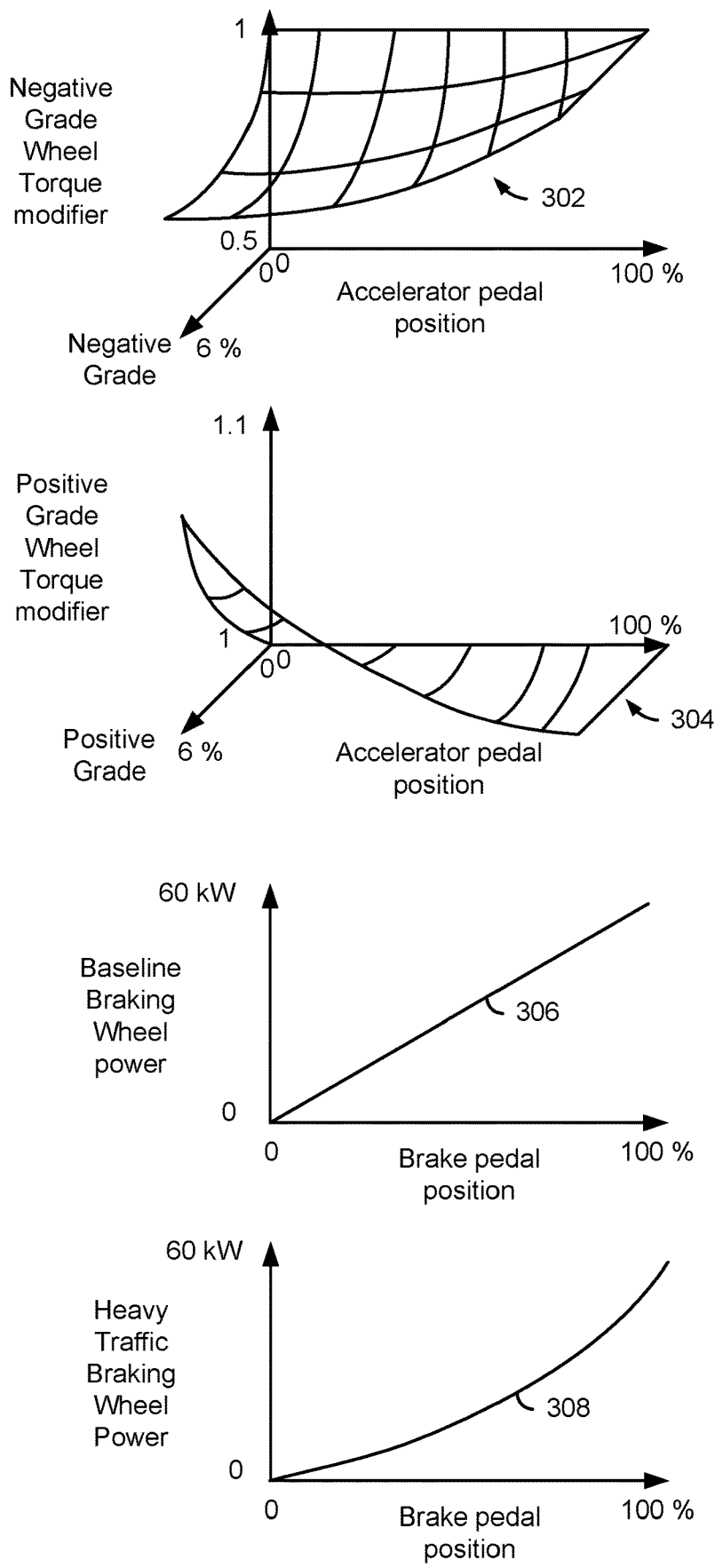
Figure 4:
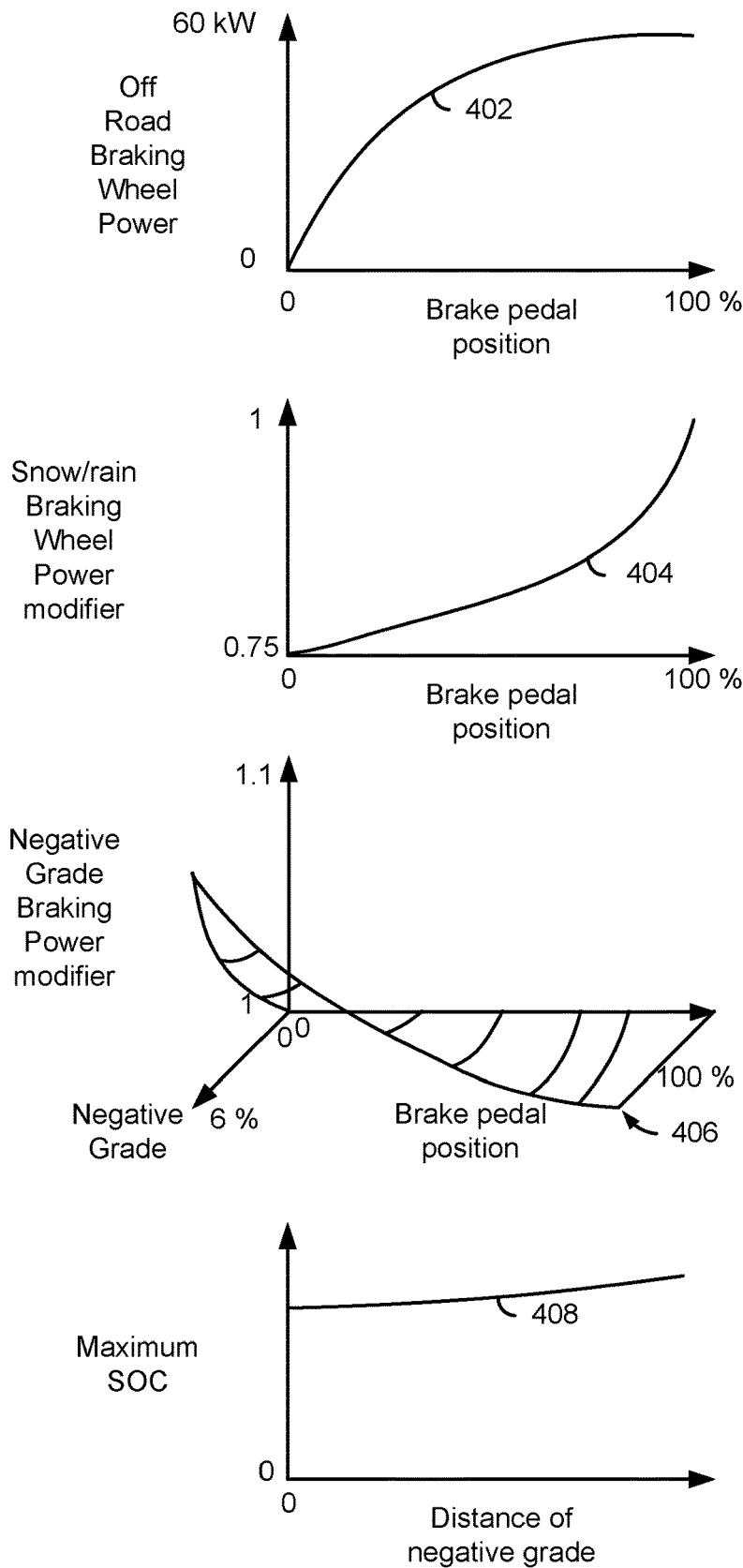
Figure 5:
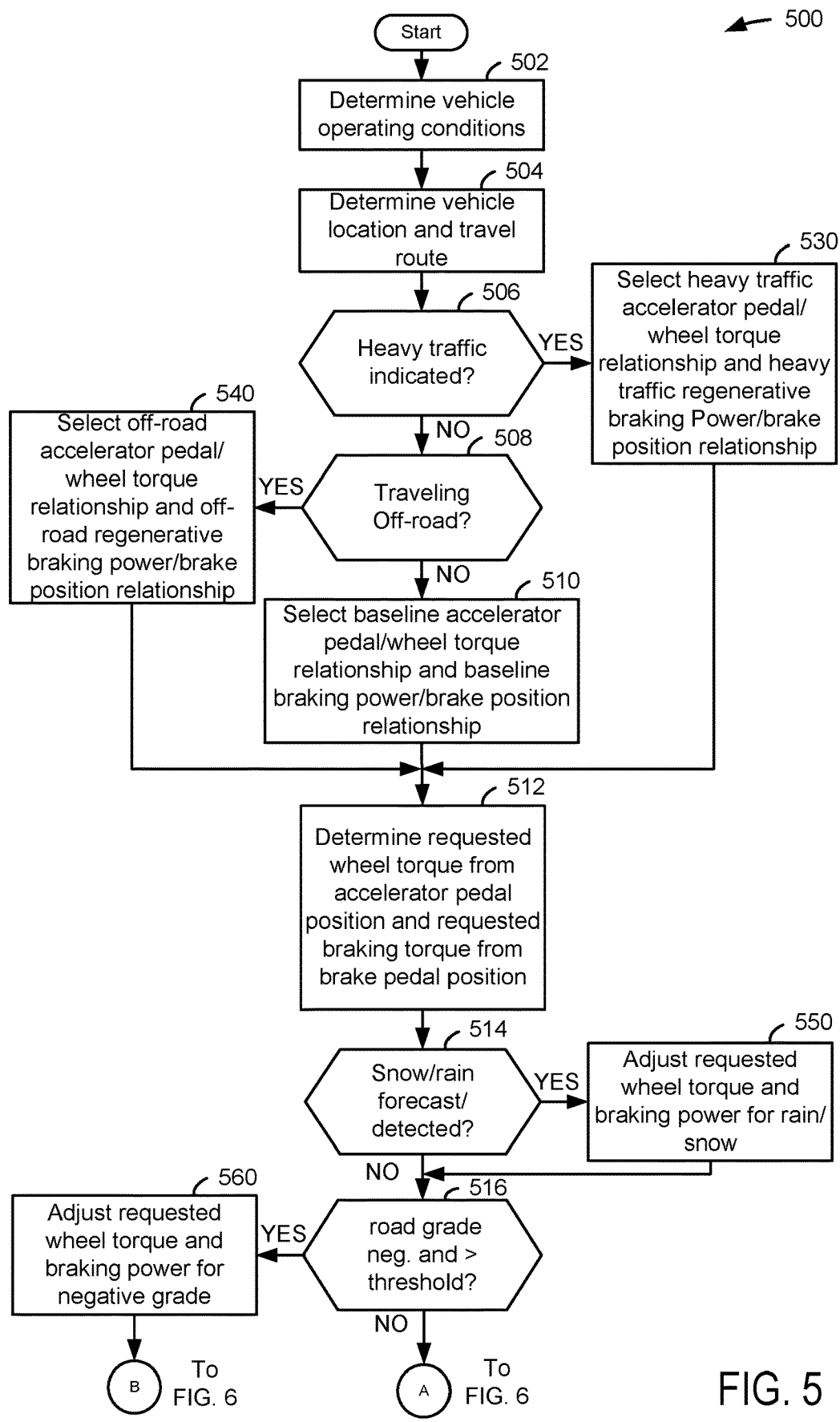
FIGS. 5 and 6 shows an example method for operating a vehicle's powertrain according to a vehicle's geographical location.
Figure 6:
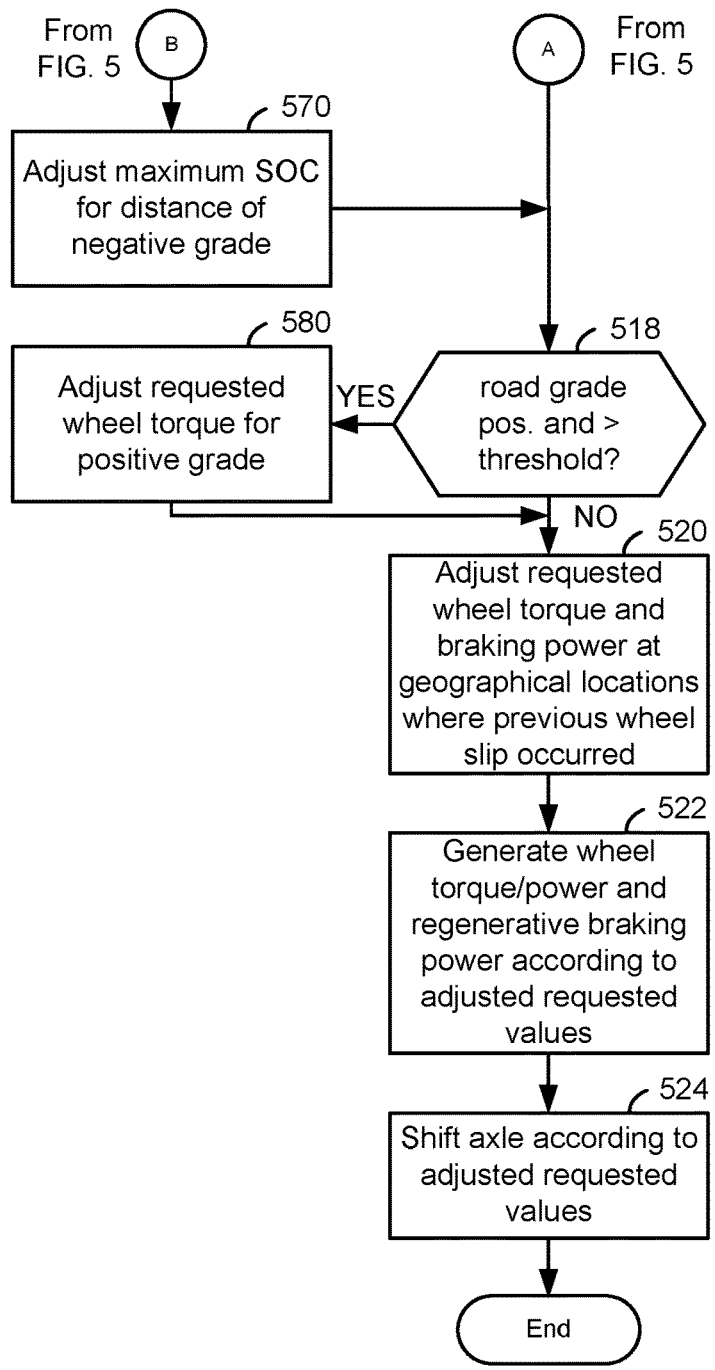

The following description relates to systems and methods for operating a powertrain of a vehicle. The powertrain may include one or more electric machines that may selectively provide power to propel the vehicle. The one or more electric machines may also selectively operate in a regeneration mode whereby the electric machines may convert mechanical energy into electrical energy. Performance of the vehicle may be adjusted as a function of a vehicle's geographical location. FIG. 1 shows an example powertrain where a powertrain performance may be adjusted as a function of a vehicle's geographical location. FIGS. 2-4 show example relationships between vehicle actuators and vehicle control parameters. FIGS. 5 and 6 show an example method for operating a powertrain according to a vehicle's geographical position.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes at two propulsion sources 105a and 105b. In one example, propulsion sources 105a and 105b may be electric machines that may operate as motors or generators. In another example, one of propulsion sources 105a and 105b may be an internal combustion engine and the other of propulsion sources 105a and 105b may be an electric machine. Thus, vehicle propulsion system 199 may be an electric vehicle or a hybrid vehicle. If one of propulsion sources 105a or 105b is an internal combustion engine, the internal combustion engine may consume liquid or gaseous fuel. Both or one of propulsion sources 105a and 105b may consume and/or generate electrical power depending on their operating mode. Throughout the description of FIG. 1, mechanical connections and hydraulic connections between the various components are illustrated as solid lines, whereas electrical connections between various components are illustrated as dashed lines.

Vehicle propulsion system 199 includes a front axle 101 and a rear axle 190. Rear axle 190 comprises two half shafts, including a first or right haft shaft 190a and a second or left half shaft 190b. Likewise, front axle 101 comprises a first or right half shaft 101a and a second or left half shaft 101b. Vehicle propulsion system 199 further includes front wheels 102 and rear wheels 103. Front wheels 102 may be selectively driven via propulsion source 105a and rear wheels 103 may be selectively drive via propulsion source 105b. Thus, propulsion system 199 may operate in a four wheel drive mode or a two wheel drive mode.

The rear axle 190 may be an integrated axle that includes a differential 106b, gearbox 107b, and propulsion source 105b. Alternatively, propulsion source 105b and gearbox 107b may be separate from rear axle 190. Gearbox 107b includes a first speed sensor 119b for sensing an input shaft speed, a second speed sensor 120b for sensing a transmission output shaft speed, a clutch actuator 112b, a sprag clutch lock ring actuator 121b, a sprag clutch 117b, and a clutch position sensor 113b. Gearbox 107b may include a parking pawl 167 to selectively prevent rotation of a transmission output shaft of gearbox 107b. The parking pawl may be engaged and disengaged via parking pawl actuator 168. In examples where propulsion source 105b is an electric machine, electric power inverter 115b is electrically coupled to propulsion source 105b. A transmission control unit 116b is electrically coupled to sensors and actuators of gearbox 107b.

Propulsion source 105b may transfer mechanical power to or receive mechanical power from gearbox 107b. As such, gearbox 107b may be a two speed gearbox that may shift between gears when commanded via transmission control unit 116b. Gearbox 107b may transfer mechanical power to or receive mechanical power from differential 106b. Differential 106b may transfer mechanical power to or receive mechanical power from wheels 103 via right half shaft 190a and left half shaft 190b. Propulsion source 105b may consume alternating current (AC) electrical power provided via electrical inverter 115b. Alternatively, propulsion source 105b may provide AC electrical power to electrical inverter 115b. Electrical power inverter 115b may be provided with high voltage direct current (DC) power from electrical energy storage device 160 (e.g., a traction battery or a traction capacitor). Electric power inverter 115b may convert the DC electrical power from electrical energy storage device 160 into AC electrical power for propulsion source 105b. Alternatively, electrical power inverter 115b may be provided with AC power from propulsion source 105b. Electric power inverter 115b may convert the AC electrical power from propulsion source 105b into DC power to store in electrical power storage device 160.

Energy storage device 160 may periodically receive electrical energy from a power source such as a stationary power grid (not shown) residing external to the vehicle (e.g., not part of the vehicle). As a non-limiting example, vehicle propulsion system 199 may be configured as a plug-in electric vehicle (EV), whereby electrical energy may be supplied to energy storage device 160 via the power grid (not shown).

Electric energy storage device 160 includes an electric energy storage device controller 139 and an electrical power distribution box 162. Electric energy storage device controller 139 may provide charge balancing between energy storage element (e.g., battery cells) and communication with other vehicle controllers (e.g., vehicle control unit 10). Power distribution module 139 controls flow of electrical power into and out of electric energy storage device 160.

The front axle 101 may be an integrated axle that includes a differential 106a, gearbox 107a, and propulsion source 105a. Alternatively, propulsion source 105a and gearbox 107a may be separate from front axle 101. Gearbox 107a includes a first speed sensor 119a for sensing an input shaft speed, a second speed sensor 120a for sensing a transmission output shaft speed, a clutch actuator 112a, a sprag clutch lock ring actuator 121a, sprag clutch 117a, and a plate clutch position sensor 113a. In examples where propulsion source 105a is an electric machine, electric power inverter 115a is electrically coupled to propulsion source 105a. A transmission control unit 116a is electrically coupled to sensors and actuators of gearbox 107a.

Propulsion source 105a may transfer mechanical power to or receive mechanical power from gearbox 107a. As such, gearbox 107a may be a two speed gearbox that may shift between gears when commanded via transmission control unit 116a. Gearbox 107a may transfer mechanical power to or receive mechanical power from differential 106a. Differential 106a may transfer mechanical power to or receive mechanical power from wheels 102 via right half shaft 101a and left half shaft 101b. Propulsion source 105a may consume alternating current (AC) electrical power provided via electrical inverter 115a. Alternatively, propulsion source 105a may provide AC electrical power to electrical inverter 115a. Electrical power inverter 115a may be provided with high voltage direct current (DC) power from electrical energy storage device 160 (e.g., a traction battery or a traction capacitor). Electric power inverter 115a may convert the DC electrical power from electrical energy storage device 160 into AC electrical power for propulsion source 105a. Alternatively, electrical power inverter 115a may be provided with AC power from propulsion source 105a. Electric power inverter 115a may convert the AC electrical power from propulsion source 105a into DC power to store in electrical power storage device 160.

Vehicle 10 includes a vehicle control unit (VCU) controller 152 (as also shown in FIG. 1) that may communicate with inverter 115a, inverter 115b, transmission controller 116a, transmission controller 116b, friction or foundation brake controller 170, global positioning system (GPS) 188, and dashboard 130 and components included therein via controller area network (CAN) 120. VCU 152 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156 as shown in FIG. 1. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 199, accelerator pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Accelerator pedal sensor 141 is shown coupled to accelerator pedal 140 for determining a degree of application of accelerator pedal 140 by human 142. Brake pedal sensor 151 is shown coupled to brake pedal 150 for determining a degree of application of brake pedal 150 by human 142.

Steering angle sensor 199 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include an interactive weather data display and notification system 134 that may communicate weather forecast data to VCU 152. Weather data display and notification system 134 may receive weather data and forecasts at the vehicle's present location from communications satellite 179. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to initiate and/or terminate operation of the vehicle driveline (e.g., electric machine 105a and electric machine 105b) based on an operator input. Various examples of the operator interface 136 may include interfaces that require a physical apparatus, such as an active key, that may be inserted into the operator interface 136 to activate the electric machines 105a and 105b and to turn on the vehicle 10, or may be removed to shut down the electric machines 105a and 105b to turn off the vehicle. Other examples may include a passive key that is communicatively coupled to the operator interface 136. The passive key may be configured as an electronic key fob or a smart key that does not have to be inserted or removed from the interface 136 to operate the vehicle electric machines 105a and 105b. Rather, the passive key may need to be located inside or proximate to the vehicle (e.g., within a threshold distance of the vehicle). Still other examples may additionally or optionally use a start/stop button that is manually pressed by the operator to start or shut down the electric machines 105a and 105b to turn the vehicle on or off. In other examples, a remote electric machine start may be initiated remote computing device (not shown), for example a cellular telephone, or smartphone-based system where a user's cellular telephone sends data to a server and the server communicates with the vehicle controller 152 to activate an inverter and electric machine. Spatial orientation of vehicle 10 is indicated via axes 175.

Vehicle 10 is also shown with a foundation or friction brake controller 170. Brake controller 170 may selectively apply and release friction brakes 172 via allowing hydraulic fluid to flow to friction brakes 172. Front friction brakes 172a and rear friction brakes 172b may be applied and released so as to avoid locking of friction brakes 172a to wheels 102 and brakes 172b to wheels 103. Wheel position or speed sensors 173 may provide wheel speed data to brake controller 170.

Vehicle propulsion system 199 may provide torque to wheels 102 and 103 to propel vehicle 10. Vehicle propulsion system 199 may operate in a two wheel drive mode where propulsion source 105a or propulsion source 105b is activated and where the other of propulsion source 105a or propulsion source 105b is not activated. Alternatively, vehicle propulsion system may operate in a four wheel drive mode where both electric machines 105a and 105b are activated.

A human or autonomous driver may request a driver demand wheel torque, or alternatively a driver demand wheel power, via applying accelerator pedal 140 or via supplying a driver demand wheel torque/power request to vehicle controller 10. Vehicle controller 152 may then allocate a fraction of the driver demand wheel torque/power to be provided by propulsion source 105a and the remaining amount of driver demand wheel torque/power to be provided via propulsion source 105b when vehicle 10 is operating in a four wheel drive mode. Thus, vehicle controller 152 may determine a torque/power distribution between front axle 101 and rear axle 190. In one example, a baseline torque/power distribution may be 50:50 or 50% of the requested wheel torque/power is to be generated via the front axle 101 and 50% of the requested wheel torque/power is to be generated via the rear axle 190 when vehicle propulsion system 199 is being operated in a four wheel drive mode.

Once vehicle controller 152 determines the torque/power distribution between the front axle 101 and the rear axle 190, vehicle controller 152 may command inverter 115a to deliver the portion of the driver demand wheel torque/power allocated to front axle 101 and may command inverter 115b to deliver the portion of the driver demand wheel torque/power allocated to rear axle 190. Inverters 115a and 115b may convert DC electrical power from electrical energy storage device 160 into AC power and supply the AC power to propulsion source 105a and propulsion source 105b. Propulsion source 105a rotates and transfers torque/power to gearbox 107a. Gearbox 107a may supply torque from propulsion source 105a to differential 106a, and differential 106a transfers torque from propulsion source 105a to wheels 102 via half shafts 101a and 101b. Similarly, propulsion source 105b rotates and transfers torque/power to gearbox 107b. Gearbox 107b may supply torque/power from propulsion source 105b to differential 106b, and differential 106b transfers torque/power from propulsion source 105b to wheels 103 via half shafts 190a and 190b.

During conditions when the accelerator pedal is fully released, vehicle controller 152 may request a small negative or regenerative braking power to gradually slow vehicle 10 when a speed of vehicle 10 is greater than a threshold speed. This regenerative braking power may mimic engine braking of vehicles having an internal combustion engine during vehicle coasting conditions. Vehicle controller 152 may determine a regenerative braking power distribution between front axle 101 and rear axle 190. The amount of regenerative braking power requested may be a function of accelerator pedal position, electric energy storage device state of charge (SOC), vehicle speed, and other conditions. If the accelerator pedal is fully released and vehicle speed is less than a threshold speed, vehicle controller 152 may request a small amount of positive torque/power from propulsion source 105a and/or 105b, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle controller 10. Vehicle controller 152 may then allocate a fraction of the driver demand braking power to be provided by propulsion source 105a and another amount of driver demand braking power to be provided via propulsion source 105b when vehicle 10 is operating in a four wheel drive mode. Additionally, vehicle controller 152 may request that a portion of the driver demanded braking power be provided via friction brakes 172 via commanding brake controller 170 to provide the requested portion of the driver requested braking power. In one example, a baseline braking power distribution may be 65:35 or 65% of the requested braking power is to be generated via the front axle 101 and 35% of the requested braking power is to be generated via the rear axle 190.

After vehicle controller 152 determines the braking power distribution between the front axle 101 and the rear axle 190, vehicle controller 152 may command inverter 115a and/or front friction brakes 172a to deliver the portion of the driver braking power allocated to front axle 101. Vehicle controller 152 may command inverter 115b and/or rear friction brakes 172b to deliver the portion of the driver demand braking power allocated to rear axle 190. Inverters 115a and 115b may convert AC electrical power generated by propulsion sources 105a and 105b converting the vehicle's kinetic energy into DC power for storage in electrical energy device 160.

Transmission control units 116a and 116b include predetermined transmission gear shift schedules whereby second gears of gearboxes 107a and 107b may be selectively engaged and disengaged. Shift schedules stored in transmission control units 116a and 116b may select gear shift points or conditions as a function of driver demand wheel torque and vehicle speed. Transmission control units 116a and 116b may selectively open and close wet or dry plate clutches 118a and 118b to engage and disengage second gear in the respective gearboxes via clutch actuators 112a and 112b.

The system of FIG. 1 provides for a vehicle system, comprising: a first electric machine coupled to an axle; a global position detecting system; and a controller including executable instructions stored in non-transitory memory that cause the controller to adjust an amount of wheel torque that is provided to a vehicle as a function of accelerator pedal position in response to a vehicle being at a geographical location where wheel slip or wheel locking of the axle occurred at a time in the past. The vehicle system includes where the geographical location is determined via the global position detecting system. The vehicle system further comprises additional instructions that cause the controller to adjust an amount of regenerative braking power that is provided to the vehicle as a function of brake pedal position in response to a vehicle being at a geographical location where wheel slip of the axle occurred at a time in the past. The vehicle system further comprises additional instructions that cause the controller to increase a maximum state of battery charge in response to a distance of a negative grade road. The vehicle system includes where the wheel torque is generated via the first electric machine. The vehicle system further comprises a second electric machine coupled to a second axle, and where the wheel torque is generated via the first electric machine and the second electric machine.

Referring now to FIG. 2, several relationships for operating a vehicle on a planned or known route are shown. The relationships shown in FIG. 2 are for illustration purposes only and are not meant to be limiting.

The first plot from the top of FIG. 2 shows an example relationship between vehicle accelerator pedal position and a base driver demand wheel torque. In other examples, the relationship may also include vehicle speed incorporated into a third axis. The vertical axis represents the base driver demand wheel torque and the base driver demand wheel torque increases in the direction of the vertical axis arrow. The horizontal axis represents vehicle speed and vehicle speed increases in the direction of the horizontal arrow. Curve 202 represents a relationship between based driver demand torque and accelerator pedal position. Curve 202 increases linearly with increasing accelerator pedal position. In this example, the maximum driver demand wheel torque is 1500 Newton-meters (Nm).

The second plot from the top of FIG. 2 shows an example relationship between vehicle accelerator pedal position and driver demand wheel torque for heavy or congested traffic conditions (e.g., stop and go traffic). In other examples, the relationship may also include vehicle speed incorporated into a third axis. The vertical axis represents the driver demand wheel torque for heavy traffic conditions and the driver demand wheel torque for heavy traffic conditions increases in the direction of the vertical axis arrow. The horizontal axis represents accelerator pedal position and accelerator pedal position increases in the direction of the horizontal arrow. Curve 204 represents a relationship between driver demand torque for heavy traffic conditions and accelerator pedal position. Wheel torque represented by curve 204 increases exponentially with increasing accelerator pedal position. In this example, the maximum driver demand wheel torque is 1500 Newton-meters (Nm). At lower accelerator pedal positions, curve 204 provides less driver demand torque than curve 202. However, at a fully depressed accelerator pedal conditions, driver demand torque of curve 204 is equal to driver demand torque of curve 202. By requiring greater accelerator pedal depression amounts to generate larger amounts of wheel torque, it may be possible to reduce rapid accelerations that may be followed by rapid decelerations so that power provided to vehicle propulsion sources may be conserved.

The third plot from the top of FIG. 2 shows an example relationship between vehicle accelerator pedal position and driver demand wheel torque for off-road conditions (e.g., a vehicle traveling where there is no road). In other examples, the relationship may also include vehicle speed incorporated into a third axis. The vertical axis represents the driver demand wheel torque for off-road conditions and the driver demand wheel torque for off-road conditions increases in the direction of the vertical axis arrow. The horizontal axis represents vehicle speed and vehicle speed increases in the direction of the horizontal arrow. Curve 206 represents a relationship between driver demand torque for off-road conditions and accelerator pedal position. Wheel torque represented by curve 206 increases exponentially, but it increases faster at smaller accelerator pedal positions and then it reaches a same ending value (e.g., where accelerator pedal position is 100%) as curves 202 and 204. Again, the maximum driver demand wheel torque is 1500 Newton-meters (Nm). By requiring less accelerator pedal depression amounts to generate larger amounts of wheel torque, it may be possible to generate sufficient amounts of torque to climb over obstacles without having to apply the accelerator pedal a long distance. This may improve off-road drivability and customer satisfaction.

The fourth plot from the top of FIG. 2 shows an example relationship between a snow or rain modification to driver demand wheel torque and accelerator pedal position. The vertical axis represents the snow or rain modification to driver demand wheel torque and the modification value increases in the direction of the vertical axis arrow. In this example, the modification range is from 0.75 to 1. Consequently, when the driver demand torque that is a function of accelerator pedal position is multiplied by the snow or rain modification to driver demand wheel torque, the result is a reduced driver demand torque, except at higher accelerator pedal positions where the driver demand wheel torque is unchanged. The horizontal axis represents accelerator pedal position and the accelerator pedal position increases (e.g., is applied further) in the direction of the horizontal arrow. Curve 208 represents a relationship between the snow or rain modification to driver demand wheel torque and accelerator pedal position. Curve 208 reaches a maximum value of 1 when the accelerator pedal is fully applied. Curve 208 may reduce driver demand wheel torque for lower accelerator pedal positions so that the vehicle's driver may have additional resolution to control driver demand wheel torque at lower accelerator pedal positions so that the possibility of inducing wheel slip may be reduced.

The plots of FIG. 2 illustrate several relationships to convey concepts described herein. However, the relationships shown in FIG. 2 are exemplary in nature and are not to be taken as limiting. Actual relationships may be different than those shown in FIG. 2 to improve vehicle drivability and to compensate for vehicle dynamics.

Referring now to FIG. 3, several relationships for operating a vehicle on a planned or known travel route are shown. The relationships shown in FIG. 3 are for illustration purposes only and are not meant to be limiting.

The first plot from the top of FIG. 3 shows an example relationship between a negative road grade (e.g., downhill road condition) modification to driver demand wheel torque, negative road grade, and accelerator pedal position. The vertical axis represents the negative road grade modification to driver demand wheel torque and the modification value increases in the direction of the vertical axis arrow. In this example, the modification range is from 0.5 to 1. Consequently, when the driver demand torque that is a function of accelerator pedal position is multiplied by the negative road grade modification to driver demand wheel torque, the result is a reduced driver demand torque, except at zero road grade where the driver demand wheel torque is unchanged. The horizontal axis represents accelerator pedal position and the accelerator pedal position increases (e.g., is applied further) in the direction of the horizontal arrow. The third axis represents negative road grade and the negative road grade increases in the direction of the arrow of the third axis. Mesh 302 represents a relationship between the negative road grade modification to driver demand torque, road grade, and accelerator pedal position. Mesh 302 reaches a maximum value of 1 when the road grade is zero. Mesh 302 reaches a minimum value of 0.5 when the negative road grade is 6% and the accelerator pedal position is near zero. Mesh 302 may reduce driver demand wheel torque for road grades of greater magnitude and for lower accelerator pedal positions so that the vehicle's driver may have less tendency to exceed posted speed limits and so that energy for the vehicle's propulsion sources may be conserved.

The second plot from the top of FIG. 3 shows an example relationship between a positive road grade (e.g., uphill road condition) modification to driver demand wheel torque, positive road grade, and accelerator pedal position. The vertical axis represents the positive road grade modification to driver demand wheel torque and the modification value increases in the direction of the vertical axis arrow. In this example, the modification range is from 1 to 1.1. Consequently, when the driver demand torque that is a function of accelerator pedal position is multiplied by the positive road grade modification to driver demand wheel torque, the result is an increased driver demand torque, except at zero road grade where the driver demand wheel torque is unchanged. The horizontal axis represents accelerator pedal position and the accelerator pedal position increases (e.g., is applied further) in the direction of the horizontal arrow. The third axis represents positive road grade and the positive road grade increases in the direction of the arrow of the third axis. Mesh 304 represents a relationship between the positive road grade modification to driver demand torque, road grade, and accelerator pedal position. Mesh 304 reaches a maximum value of 1.1 when the road grade is 6% and accelerator pedal position is near zero. Mesh 304 reaches a minimum value of 1 when the negative road grade is zero. Mesh 304 may increase driver demand wheel torque for road grades of greater magnitude and for lower accelerator pedal positions so that the vehicle's driver may have less tendency to make large accelerator pedal position changes so that propulsion source torque delivery may be smoother when large positive grades are encountered.

The third plot from the top of FIG. 3 shows an example relationship between vehicle brake pedal position and baseline braking power. In other examples, the relationship may also include vehicle speed incorporated into a third axis. The vertical axis represents the baseline braking power and the baseline braking power in the direction of the vertical axis arrow. The horizontal axis represents brake pedal position and brake pedal position increases (e.g., is applied farther) in the direction of the horizontal arrow. Curve 306 represents a relationship between baseline braking power and brake pedal position. In this example, braking power increases linearly with brake pedal position. In this example, the maximum braking power is 60 kilowatts (kW). The requested braking power may be delivered via only regenerative braking, a combination of regenerative braking and friction braking, or via only friction braking.

The fourth plot from the top of FIG. 3 shows an example relationship between brake pedal position and braking power for heavy traffic conditions. In other examples, the relationship may also include vehicle speed incorporated into a third axis. The vertical axis represents the braking power for heavy traffic conditions and the braking power for heavy traffic conditions increases in the direction of the vertical axis arrow. The horizontal axis represents brake pedal position and brake pedal position increases in the direction of the horizontal arrow. Curve 308 represents a relationship between braking power for heavy traffic conditions and brake pedal position. Braking power represented by curve 308 increases exponentially with increasing brake pedal position. In this example, the maximum braking power is 60 kilo-watts (kW). At lower brake pedal positions, curve 308 provides less braking power than curve 306. However, at a fully depressed brake pedal conditions, braking power of curve 308 is equal to braking power of curve 306 at fully depressed brake pedal conditions. By requiring greater brake pedal depression amounts to generate larger amounts of braking power, it may be possible to reduce rapid decelerations that may require both friction braking and regenerative braking so that more of the vehicle's kinetic energy may be converted into electrical energy.

The plots of FIG. 3 illustrate several relationships to convey concepts described herein. However, the relationships shown in FIG. 3 are exemplary in nature and are not to be taken as limiting. Actual relationships may be different than those shown in FIG. 3 to improve vehicle drivability and to compensate for vehicle dynamics.

Referring now to FIG. 4, several relationships for operating a vehicle on a planned or known route are shown. The relationships shown in FIG. 4 are for illustration purposes only and are not meant to be limiting.

The first plot from the top of FIG. 4 shows an example relationship between vehicle brake pedal position and braking power for off-road conditions. In other examples, the relationship may also include vehicle speed incorporated into a third axis. The vertical axis represents the braking power demand for off-road conditions and the braking power demand for off-road conditions increases in the direction of the vertical axis arrow. The horizontal axis represents brake pedal position and brake pedal position increases in the direction of the horizontal arrow. Curve 402 represents a relationship between braking power for off-road conditions and brake pedal position. Braking power represented by curve 402 increases exponentially, but it increases faster at smaller brake pedal positions and then it reaches a same ending value (e.g., where brake pedal position is 100%) as curves 306. The maximum braking power is 60 kW. By requiring less brake pedal depression amounts to generate larger amounts of braking torque, it may be possible to hold the vehicle on steeper off-road terrain without having to apply the brake pedal a long distance. This may improve off-road drivability and customer satisfaction.

The second plot from the top of FIG. 4 shows an example relationship between a snow or rain modification to braking power demand and brake pedal position. The vertical axis represents the snow or rain modification to braking power demand wheel torque and the modification value increases in the direction of the vertical axis arrow. In this example, the modification range is from 0.75 to 1. Consequently, when the braking power demand, which is a function of brake pedal position, is multiplied by the snow or rain modification to braking power demand, the result is a reduced braking power demand, except at higher brake pedal positions where the braking power demand is unchanged. The horizontal axis represents brake pedal position and the brake pedal position increases (e.g., is applied further) in the direction of the horizontal arrow. Curve 404 represents a relationship between the snow or rain modification to braking power demand and brake pedal position. Curve 404 reaches a maximum value of 1 when the brake pedal is fully applied. Curve 404 may reduce braking power for lower brake pedal positions so that the vehicle's driver may have additional resolution to control braking power at lower brake pedal positions so that the possibility of inducing wheel locking may be reduced, thereby improving opportunities for regenerating the vehicle's kinetic energy into electrical energy.

The third plot from the top of FIG. 4 shows an example relationship between a negative road grade modification to a braking power request, negative road grade, and brake pedal position. The vertical axis represents the negative road grade modification to a braking power request and the modification value increases in the direction of the vertical axis arrow. In this example, the modification range is from 1 to 1.1. Consequently, when the braking power demand, which is a function of brake pedal position, is multiplied by the negative road grade modification to braking power demand, the result is an increased braking power, except at zero road grade where the braking power demand is unchanged. The horizontal axis represents brake pedal position and the brake pedal position increases in the direction of the horizontal arrow. The third axis represents negative road grade and the negative road grade magnitude increases in the direction of the arrow of the third axis. Mesh 406 represents a relationship between the negative road grade modification to braking power demand, road grade, and brake pedal position. Mesh 406 reaches a maximum value of 1.1 when the road grade is 6% and brake pedal position is near zero. Mesh 406 reaches a minimum value of 1 when the negative road grade is zero. Mesh 406 may increase braking power demand for grades of greater magnitude and for lower brake pedal positions so that the vehicle's driver may maintain vehicle speed with less effort and so that the vehicle's driver may have less tendency to make large brake pedal position changes so that more of the vehicle's kinetic energy may be captured via the vehicle's propulsion source instead of being converted into heat by the vehicle's friction brakes.

The fourth plot from the top of FIG. 4 shows a plot of a maximum electric energy storage device state of charge (SOC) versus a distance of a negative grade road immediately in the vehicle's path of travel. The vertical axis represents the maximum SOC for the vehicle's electric energy storage device and the maximum SOC increases in the direction of the vertical axis arrow. The horizontal axis represents a distance or length of a negative road that is immediately in front of the vehicle and in the vehicle's path of travel. The distance increases in the direction of the horizontal axis arrow. It may be observed that the maximum SOC increases as the distance of the negative grade increases. The distance of the negative grade may be determined at the start of where the road being traveled by the vehicle turns to a negative grade. The distance ends at where the road being traveled by the vehicle turns to zero grade or positive grade. The maximum SOC value may be determined at the start of where the road being traveled by the vehicle turns to a negative graded and the maximum SOC may not be updated until the vehicle reaches the end of the negative grade. In this way, the maximum SOC may be established at the beginning of where the road grade becomes negative so that the maximum SOC does not continuously decrease as the distance of the negative grade decreases. By increasing the maximum SOC as a function of negative grade distance, it may be possible to increase the amount of charge stored on-board the vehicle when conditions favor regeneration.

The plots of FIG. 4 illustrate several relationships to convey concepts described herein. However, the relationships shown in FIG. 4 are exemplary in nature and are not to be taken as limiting. Actual relationships may be different than those shown in FIG. 4 to improve energy conversion during regeneration and to compensate for vehicle dynamics.

Referring now to FIGS. 5 and 6, a method for operating a vehicle according to the vehicle's travel route is shown. The method of FIGS. 5 and 6 may be incorporated into and may cooperate with the system of FIG. 1. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include, but are not limited to vehicle position, electric energy storage device SOC, traffic conditions, weather forecast, road grade, road distance, and ambient temperature. Method 500 may determine the vehicle operating conditions based on output of the various sensors and actuators described herein as well as geographical maps stored within one or more vehicle controllers. Method 500 proceeds to 504 after determining vehicle operating conditions.

At 504, method 500 determines the vehicle's present position. The vehicle's present position may be determined via a GPS that determines vehicle position from satellite data and geographical maps stored in the GPS. Method 500 may determine the vehicle's travel route via data input by the vehicle's driver or an autonomous driver into the vehicle's navigation system. Method 500 proceeds to 506.

At 506, method 500 judges if the vehicle is traveling in heavy traffic conditions. In one example, method 500 may judge that the vehicle is traveling in heavy traffic conditions based on data supplied over the internet. Alternatively, method 500 may determine that the vehicle is traveling in heavy traffic conditions based on output of ranging sensors (e.g., Lidar, RADAR, etc.). Heavy traffic conditions may be determined based on or as a function of an amount of time it takes the vehicle to travel a predetermined distance. If method 500 judges that the vehicle is traveling in heavy traffic conditions, the answer is yes and method 500 proceeds to 530. Otherwise, the answer is no and method 500 proceeds to 508.

At 530, method 500 selects a relationship between accelerator pedal position and driver demand or requested wheel torque/power for heavy traffic conditions (e.g., a function as represented by the second plot from the top of FIG. 2). Method 500 also selects a relationship between brake pedal position and braking power for heavy traffic conditions (e.g., a function as represented by the fourth plot from the top of FIG. 3). Method 500 proceeds to 512.

At 508, method 500 judges if the vehicle is traveling in off-road conditions. In one example, method 500 may judge that the vehicle is traveling in off-road conditions based on data supplied over the internet. Alternatively, method 500 may determine that the vehicle is traveling in off-road conditions based on output of the GPS and geographical maps. If method 500 judges that the vehicle is traveling in off-road conditions, the answer is yes and method 500 proceeds to 53. Otherwise, the answer is no and method 500 proceeds to 510.

At 540, method 500 selects a relationship between accelerator pedal position and driver demand or requested wheel torque/power for off-road conditions (e.g., a function as represented by the third plot from the top of FIG. 2). Method 500 also selects a relationship between brake pedal position and braking power for off-road conditions (e.g., a function as represented by the first plot from the top of FIG. 4). Method 500 proceeds to 512.

At 510, method 500 selects a baseline relationship between accelerator pedal position and driver demand or requested wheel torque/power (e.g., a function as represented by the first plot from the top of FIG. 2). Method 500 also selects a baseline relationship between brake pedal position and braking power (e.g., a function as represented by the third plot from the top of FIG. 3). Method 500 proceeds to 512.

At 512, method 500 determines a requested or desired wheel torque that is based on the selected accelerator pedal to wheel torque relationship (e.g., the relationship selected at 530, 540, or 510). In particular, method 500 determines the present accelerator pedal position and determines the requested wheel torque by referencing the selected relationship with the present accelerator pedal position. Method 500 may also determine a requested or desired braking power that is based on the selected brake pedal to braking power relationship (e.g., the relationship selected at 530, 540, or 510). Specifically, method 500 determines the present brake pedal position and determines the requested braking power by referencing the selected relationship with the present brake pedal position. Method 500 proceeds to 514 after determining the requested or desired driver demand wheel torque and/or requested or desired driver demand braking power.

At 514, method 500 judges if rain or snow is forecast for the road that the vehicle is traveling on at the present time the vehicle is traveling the road. In one example, method 500 may judge that rain or snow is forecast for the road that the vehicle is presently traveling based on weather data received via a vehicle controller or system (e.g., weather maps) and vehicle position as determined via the GPS. If method 500 judges that rain or snow is forecast for the road that the vehicle is traveling at the time the vehicle is traveling the road, then the answer is yes and method 500 proceeds to 550. Otherwise, the answer is no and method 500 proceeds to 516.

At 550, method 500 adjusts the requested or demand wheel torque for forecast rain or snow. In one example, method 500 multiplies the driver demanded or requested wheel torque by a relationship between accelerator pedal position and a rain or snow driver demand or requested wheel torque/power modification (e.g., a function as represented by the fourth plot from the top of FIG. 2). Method 500 may also multiply the driver demanded or requested braking power by a relationship between brake pedal position and a rain or snow braking power modification (e.g., a function as represented by the second plot from the top of FIG. 4). Method 500 proceeds to 516.

At 516, method 500 judges if road grade of the road that the vehicle is traveling is negative and greater than a threshold road grade. In one example, method 500 may judge that the road grade is negative and greater than a threshold based on GPS data. In another example, method 500 may judge that road grade is negative and greater than a threshold based on output of an inclinometer. If method 500 judges that road grade is negative and greater than a threshold, then the answer is yes and method 500 proceeds to 560. Otherwise, the answer is no and method 500 proceeds to 518.

At 560, method 500 adjusts the requested or demand wheel torque according to the negative road grade. In one example, method 500 multiplies the driver demanded or requested wheel torque by a relationship between accelerator pedal position and a road grade modification (e.g., a function as represented by the first plot from the top of FIG. 3). Method 500 may also multiply the driver demanded or requested braking power by a relationship between a negative road grade braking power modification (e.g., a function as represented by the third plot from the top of FIG. 4). Method 500 proceeds to 570.

At 570, method 500 adjusts the maximum electric energy storage device SOC based on the length of distance of the negative grade road that the vehicle is presently traveling. In one example, the SOC maximum may be adjusted according to a function as shown in the fourth plot from the top of FIG. 4. Thus, as the distance of the negative grade portion of the road being traveled by the vehicle increases, the maximum SOC increases. This may allow the electric energy storage device to increase SOC during some conditions when it may be possible to provide additional charge to the electric energy storage device. Method 500 proceeds to 518.

At 518, method 500 judges if road grade of the road that the vehicle is traveling is positive and greater than a threshold road grade. In one example, method 500 may judge that the road grade is positive and greater than a threshold based on GPS data. In another example, method 500 may judge that road grade is positive and greater than a threshold based on output of an inclinometer. If method 500 judges that road grade is positive and greater than a threshold, then the answer is yes and method 500 proceeds to 580. Otherwise, the answer is no and method 500 proceeds to 520.

At 580, method 500 adjusts the requested or demand wheel torque according to the positive road grade. In one example, method 500 multiplies the driver demanded or requested wheel torque by a relationship between accelerator pedal position and a road grade modification (e.g., a function as represented by the second plot from the top of FIG. 3). Method 500 proceeds to 520.

At 520, method 500 adjusts the requested or demand wheel torque according to the vehicle's present position. Method 500 may record geographical locations to controller RAM where the vehicle has encountered wheel slip in the past. If the vehicle is within a predetermined distance of a location where wheel slip has previously been detected in the past, method 500 may adjust the requested or desired wheel torque/power to reduce the possibility of wheel slip. In one example, method 500 may reduce the requested wheel torque by a predetermined amount (e.g., 5% of requested wheel torque). Similarly, if the vehicle is within a predetermined distance of a location where wheel locking has previously been detected in the past, method 500 may adjust the requested or desired braking power to reduce the possibility of wheel locking. In one example, method 500 may reduce the requested braking torque by a predetermined amount (e.g., 5% of requested braking torque). Method 500 proceeds to 522.

At 522, method 500 generates the requested or demanded wheel torque/power.

Method 500 also generates the requested or demanded braking power. Method 500 may generate the requested or demanded wheel torque/power via commanding one or more propulsion sources to provide the requested or desired wheel torque/power. The requested or desired wheel torque/power may be commanded via the vehicle control unit 252 commanding one or more inverters to adjust an amount of electrical power that is delivered via one or more propulsion sources in a motoring mode. A portion or all of the requested or demanded braking power may be commanded via the vehicle control unit 252 commanding one or more inverters to adjust an amount of power that is received from one or more propulsion sources in a regeneration mode. Additionally, a portion or all of the requested or demanded braking power may be commanded via the vehicle control unit 252 commanding the friction braking controller 170 to provide braking power. The sum of friction braking power and regenerative braking power is equal to the requested or demanded braking power. If both wheel torque and braking torque are requested, then method 500 may provide the difference between requested or demanded wheel torque/power and requested or demanded braking power. Method 500 proceeds to 524.

Method 500 may also monitor the front wheels and rear wheels for wheel slip when braking power or positive wheel torque is requested. If wheel slip or wheel lock (e.g., rotation of a wheel is less than a threshold speed when vehicle speed is greater than a threshold speed) is detected, method 500 may store the vehicle's location and rain/snow conditions in controller RAM so that wheel torque/power and braking power may be adjusted if the vehicle travels over the same road location in the future, thereby preempting the wheel slip/lock in an effort to prevent the same.

At 524, method 500 shifts the transmission in response to the requested or demanded wheel torque. In one example, the transmission is shifted according to shift schedules that are a function of vehicle speed and driver demand wheel torque/power. The adjustments to the requested or demanded wheel power increases or decreases driver demand wheel power according to accelerator pedal position and other vehicle conditions. The adjusted driver demand wheel power is the basis for shifting the transmission along with the transmission shifting schedule. Method 500 proceeds to exit.

In this way, the driving route of the vehicle and conditions along the driving route may be the basis for adjusting vehicle operation. The adjustments may help to conserve energy and improve energy recovery.

Thus, the method of FIGS. 5 and 6 provides for a method for operating a vehicle powertrain, comprising: adjusting a relationship between an accelerator pedal position and a powertrain torque request in response to a geographical position of a vehicle. The method includes where the geographical position of the vehicle is determined via a global positioning system. The method includes where adjusting the relationship includes increasing a wheel torque with respect to the accelerator pedal position when the geographical position of the vehicle indicates that the vehicle is traveling off-road as compared to the wheel torque with respect to the accelerator pedal position when the geographical position of the vehicle indicates that the vehicle is traveling on-road. The method further comprises adjusting the relationship between the accelerator pedal position and the powertrain torque request in response to forecast snow or rain.

In some examples, the method further comprises adjusting the relationship between the accelerator pedal position and the powertrain torque request in response to the vehicle being at a geographical location where wheel slip of the vehicle occurred in the past. The method includes where adjusting the relationship between the accelerator pedal position and the powertrain torque request includes decreasing the powertrain torque request as a function of accelerator pedal position. The method further comprises adjusting the relationship between the accelerator pedal position and the powertrain torque request in response to an indication of heavy traffic. The method includes where the indication of heavy traffic is based on a distance the vehicle is from a second vehicle. The method includes where the indication of heavy traffic is further based on an actual total number of stops of the vehicle in a predetermined amount of time.

The method of FIGS. 5 and 6 also provides for a method for operating a vehicle powertrain, comprising: adjusting a relationship between an accelerator pedal position and a powertrain torque request in response to a geographical position of the vehicle; and adjusting a relationship between a brake pedal position and regenerative braking power in response to the geographical position of the vehicle. The method includes where adjusting the relationship between the brake pedal position and regenerative braking power includes increasing the regenerative braking power with respect to the brake pedal position when the geographical position of the vehicle indicates that the vehicle is traveling off-road as compared to the regenerative braking power with respect to the brake pedal position when the geographical position of the vehicle indicates that the vehicle is traveling on-road. The method further comprises adjusting the relationship between the brake pedal position and the regenerative braking power in response to forecast snow or rain.

In some examples, the method further comprises adjusting the relationship between a maximum state of charge of an electric energy storage device in response to a distance of a negative grade road being traveled by the vehicle. The method further comprises adjusting the relationship between the brake pedal position and the regenerative braking power in response to a grade of a road being traveled by the vehicle.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle powertrain, comprising:
adjusting a relationship between an accelerator pedal position and a powertrain torque request in response to a geographical position of a vehicle, where adjusting the relationship includes increasing a wheel torque with respect to the accelerator pedal position when the geographical position of the vehicle indicates that the vehicle is traveling off-road as compared to the wheel torque with respect to the accelerator pedal position when the geographical position of the vehicle indicates that the vehicle is traveling on-road.

2. The method of claim 1, where the geographical position of the vehicle is determined via a global positioning system.

3. The method of claim 1, further comprising adjusting the relationship between the accelerator pedal position and the powertrain torque request in response to forecast snow or rain.

4. The method of claim 1, further comprising adjusting the relationship between the accelerator pedal position and the powertrain torque request in response to the vehicle being at a geographical location where wheel slip or wheel locking of the vehicle occurred in the past.

5. The method of claim 4, where adjusting the relationship between the accelerator pedal position and the powertrain torque request includes decreasing the powertrain torque request as a function of accelerator pedal position.

6. The method of claim 1, further comprising adjusting the relationship between the accelerator pedal position and the powertrain torque request in response to an indication of heavy traffic.

7. The method of claim 6, where the indication of heavy traffic is based on a distance the vehicle is from a second vehicle.

8. The method of claim 7, where the indication of heavy traffic is further based on an actual total number of stops of the vehicle in a predetermined amount of time.

9. A method for operating a vehicle powertrain, comprising:
adjusting a relationship between an accelerator pedal position and a powertrain torque request in response to a geographical position of a vehicle; and
adjusting a relationship between a brake pedal position and regenerative braking power in response to the geographical position of the vehicle.

10. The method of claim 9, where adjusting the relationship between the brake pedal position and regenerative braking power includes increasing the regenerative braking power with respect to the brake pedal position when the geographical position of the vehicle indicates that the vehicle is traveling off-road as compared to the regenerative braking power with respect to the brake pedal position when the geographical position of the vehicle indicates that the vehicle is traveling on-road.

11. The method of claim 9, further comprising adjusting the relationship between the brake pedal position and the regenerative braking power in response to forecast snow or rain.

12. The method of claim 9, where the vehicle powertrain receives power via an electric energy storage device, and further comprising:
adjusting a relationship between a maximum state of charge of the electric energy storage device in response to a distance of a negative grade road being traveled by the vehicle.

13. The method of claim 9, further comprising adjusting the relationship between the brake pedal position and the regenerative braking power in response to a grade of a road being traveled by the vehicle.

14. A vehicle system, comprising:
a first electric machine coupled to an axle;
a global position detecting system; and
a controller including executable instructions stored in non-transitory memory that cause the controller to adjust an amount of wheel torque that is provided to a vehicle as a function of accelerator pedal position in response to a vehicle being at a geographical location where wheel slip of the axle occurred at a time in the past.

15. The vehicle system of claim 14, where the geographical location is determined via the global position detecting system.

16. The vehicle system of claim 14, further comprising additional instructions that cause the controller to adjust an amount of regenerative braking power that is provided to the vehicle as a function of brake pedal position in response to a vehicle being at a geographical location where wheel slip of the axle occurred at a time in the past.

17. The vehicle system of claim 14, further comprising additional instructions that cause the controller to increase a maximum state of battery charge in response to a distance of a negative grade road.

18. The vehicle system of claim 14, where the wheel torque is generated via the first electric machine.

19. The vehicle system of claim 14, further comprising a second electric machine coupled to a second axle, and where the wheel torque is generated via the first electric machine and the second electric machine.

* * * * *